T. R. BRUMFIELD.
WIRE CLAMP.
APPLICATION FILED JUNE 12, 1918.

1,289,380.

Patented Dec. 31, 1918.

WITNESSES

INVENTOR
THOMAS R. BRUMFIELD
BY
ATTORNEYS

UNITED STATES PATENT OFFICE.

THOMAS ROBERT BRUMFIELD, OF DANVILLE, VIRGINIA.

WIRE-CLAMP.

1,289,380.

Specification of Letters Patent.

Patented Dec. 31, 1918.

Application filed June 12, 1918. Serial No. 239,691.

*To all whom it may concern:*

Be it known that I, THOMAS R. BRUMFIELD, a citizen of the United States, and a resident of Danville, in the county of Pittsylvania and State of Virginia, have made certain new and useful Improvements in Wire-Clamps, of which the following is a specification.

My present invention relates generally to wire clamps, and more particularly to a readily adjustable clamp which will, without undue complication, accommodate a great variety of different gages of wire, clamping such gages of wires in an effective efficient manner in connection with the joining of wire ends or other operations.

In the accompanying drawing which illustrates my present invention:—

Figure 1:
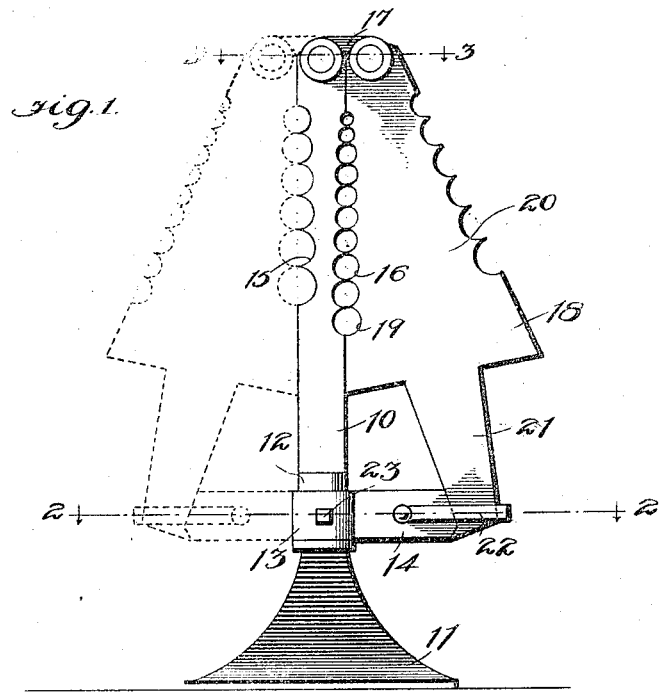
Figure 1 is an elevation of my improved wire clamp complete.
Figure 2:
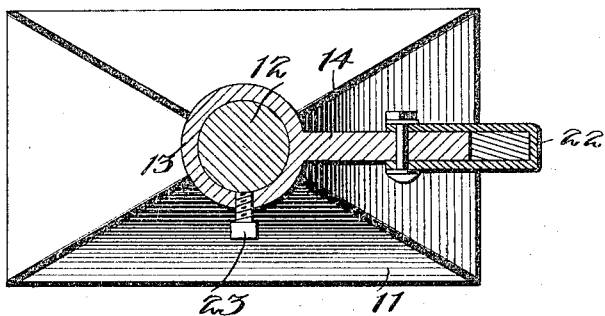
Fig. 2 is a horizontal section taken substantially on line 2—2 of Fig. 1.
Figure 3:
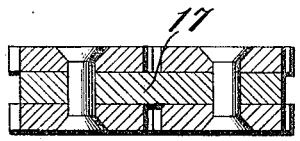
Fig. 3 is a similar view taken substantially on line 3—3 of Fig. 1.

Referring now to these figures, my invention contemplates a wire clamp, including an upright 10, mounted on or forming part of a base or stand 11, and provided adjacent the upper portion of said base or stand with a cylindrical section 12, on which is mounted the tubular inner end 13 of a horizontally disposed outstanding clamping arm 14.

Between its cylindrical section 12 and its extreme upper end, the upright 10 is provided along its opposite side edges with a series of graduated recesses, the recess 15 along one side edge constituting one series and the recesses 16 along the opposite side edge constituting another series.

At its upper extremity, the upright 10 is connected by a link 17 to the upper end of a companion clamping lever, the tapering sides edges of which are respectively provided with a series of recesses 18 and 19, graduated to coöperate with the series of openings 15 and 16 of the upright 10, for which purpose the said lever 20 is shiftable by virtue of the link 17 to the relatively opposite sides of the upright 10, as will be observed by reference to the full and dotted line positions of Fig. 1.

At its free end the clamping lever 20 has an extension 21 which abuts the extremity of the clamping arm 14, and around which a U-shaped clasping member 22 pivoted on said arm 14 is shiftable in order to hold the lever 20 in either position. Thus, in view of the reversal of the clamping lever 20, the arm 14 is shiftable around the upright 10 upon its cylindrical section 12, although the said arm 14 may be clamped in either position by a set screw 23 threaded therethrough and engageable with the said cylindrical section 12 of the upright.

It will be obvious from reference to Fig. 1, that with the lever 20 in the position shown in full lines, the series of openings 16 and 19 of the upright 10 and the lever, coöperate to form openings of graduated diameter for receiving and clamping wires of different gage, progressively increasing in diameter from the upper to the lower end of such series, and that when the lever 20 is reversed and secured in the position shown in dotted lines, the series of recesses 15 and 18 coöperate to form graduated openings progressing from smaller to larger, and from the upper to the lower end of the series of which the smallest opening of the series is the next greater in size as compared to the largest of the series of openings, formed by recesses 16 and 19. It is also obvious that the adjustments may be quickly made, and that my invention thus provides for the clamping of a great variety of different gages of wire, without unduly complicated parts, with parts which are subjected to minimum wear and that all together my invention proposes a strong durable device of this nature, the adjustments of which may be readily made and quickly accomplished.

I claim:—

1. A wire clamp comprising an upright having a series of recesses along the opposite side edges thereof, a clamping lever pivotally connected to the said upright and shiftable to opposite sides thereof, said lever having along its opposite sides, series of recesses arranged to coöperate with the recesses of the opposite side edges of the upright, for the purpose of forming wire receiving openings, and means shiftable on the upright to receive and hold the lever in its different positions.

2. A wire clamp comprising an upright having a supporting base, a lever pivoted at one end to the upper end of the upright, and having its opposite side edges shiftable into engagement with the opposite side edges of the upright, said opposite side edges of said upright and said lever having graduated series of recesses arranged to coact in the formation of graduated openings, and means for holding the said lever at opposite sides of the upright, as described.

3. A wire clamp comprising an upright, a lever pivoted to the upright and shiftable to engage its opposite side edges with the opposite side edges of the upright, said opposite side edges of said upright and said lever having graduated recesses coöperating to form graduated series of wire clamping openings, and an arm carried by and adjustable around the upright having a clasp for engagement with the said lever to hold the latter in its opposite positions.

4. A wire clamp comprising an upright having a supporting base and a cylindrical portion adjacent said base, an arm having a tubular end disposed on the cylindrical section of the upright and shiftable thereon around the upright, a lever pivotally connected at one end to the upper end of the upright and engageable at its opposite side edges with the opposite side edges of the said upright, said opposite side edges of said upright and lever having graduated recesses forming a series of graduated wire receiving openings, and said lever having an extension and a clasp movably supported by the said arm engageable with the extension to securely hold the lever in its opposite positions.

THOMAS ROBERT BRUMFIELD.

Witnesses:
T. M. MATHEWS,
D. A. McKINNEY.

Copies of this patent may be obtained for five cents each, by addressing the "Commissioner of Patents, Washington, D. C."